United States Patent [19]

Takei

[11] Patent Number: 4,992,855
[45] Date of Patent: Feb. 12, 1991

[54] IMAGE PICKUP APPARATUS WITH WHITE BALANCE CONTROL BASED ON AMBIENT LIGHT FLICKER

[75] Inventor: Masahiro Takei, Yokohama, Japan

[73] Assignee: Canon Kabushiki Kaisha, Tokyo, Japan

[21] Appl. No.: 388,977

[22] Filed: Aug. 3, 1989

Related U.S. Application Data

[63] Continuation of Ser. No. 3,771, Jan. 16, 1987, Pat. No. 4,879,591.

[30] Foreign Application Priority Data

Jan. 31, 1986 [JP] Japan .................................. 61-18191
Jan. 31, 1986 [JP] Japan .................................. 61-18192
Jan. 31, 1986 [JP] Japan .................................. 61-18193

[51] Int. Cl.$^5$ ............................................. H04N 9/73
[52] U.S. Cl. ................................... 358/29; 358/29 C; 358/41
[58] Field of Search ................. 358/29 C, 228, 41, 29

[56] References Cited

U.S. PATENT DOCUMENTS

| 4,574,303 | 3/1986 | Hashimoto et al. | 358/29 C |
|---|---|---|---|
| 4,584,598 | 4/1986 | Kutaragi | 358/29 C |
| 4,595,946 | 6/1986 | Uehara et al. | 358/29 C |
| 4,616,253 | 10/1986 | Hashimoto et al. | 358/29 C |
| 4,774,588 | 9/1988 | Noda et al. | 358/228 |
| 4,833,525 | 5/1989 | Suzuki et al. | 358/29 C |

Primary Examiner—James J. Groody
Assistant Examiner—Mark R. Powell
Attorney, Agent, or Firm—Fitzpatrick, Cella, Harper & Scinto

[57] ABSTRACT

An image pickup apparatus includes image pickup circuitry for producing an image signal in response to a received image. Detecting circuitry is provided for detecting (1) a phase of a flicker component associated with a light source, and (2) a relationship between the detected phase of the flicker component and the timing of producing the image pickup signal by the image pickup circuitry. A control circuit is provided for controlling a white balance of the output of the image pickup circuitry based on the output of the detection circuitry.

13 Claims, 9 Drawing Sheets

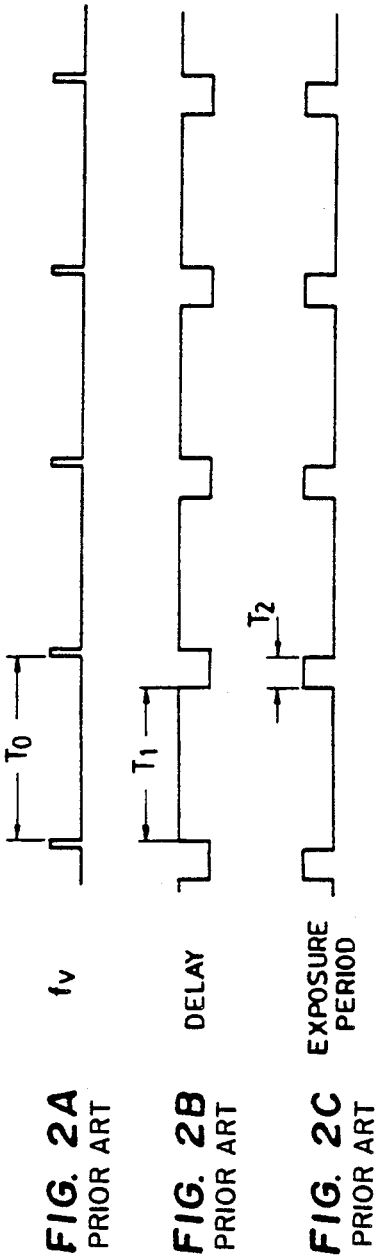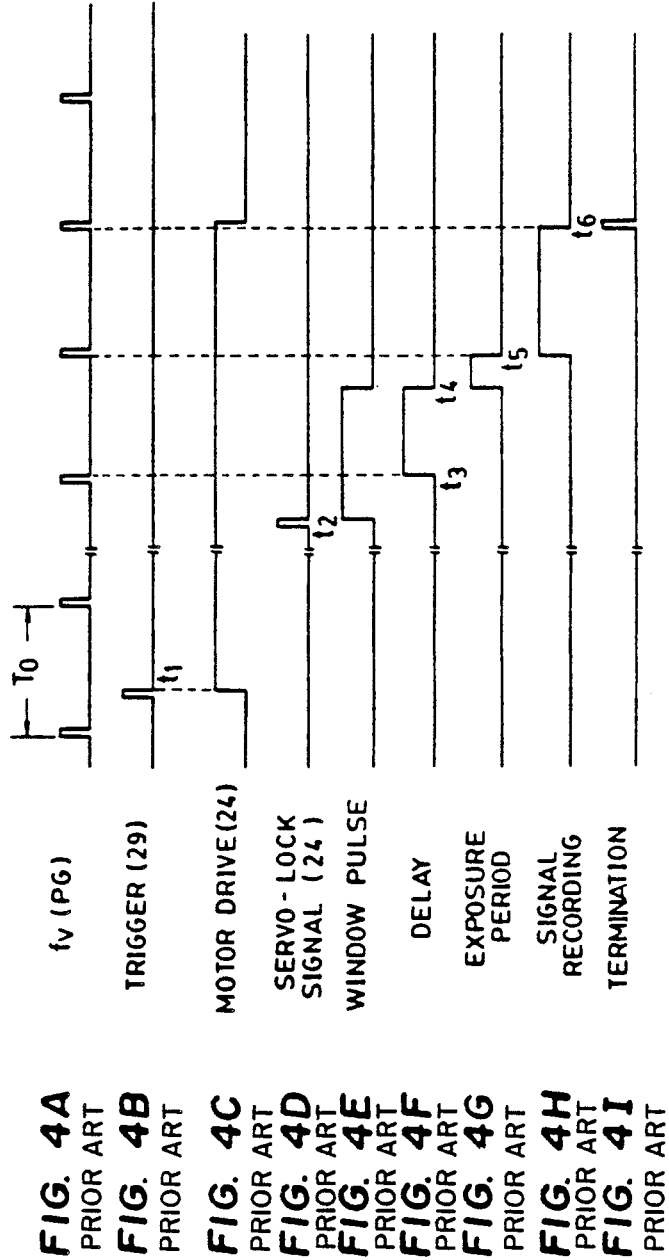

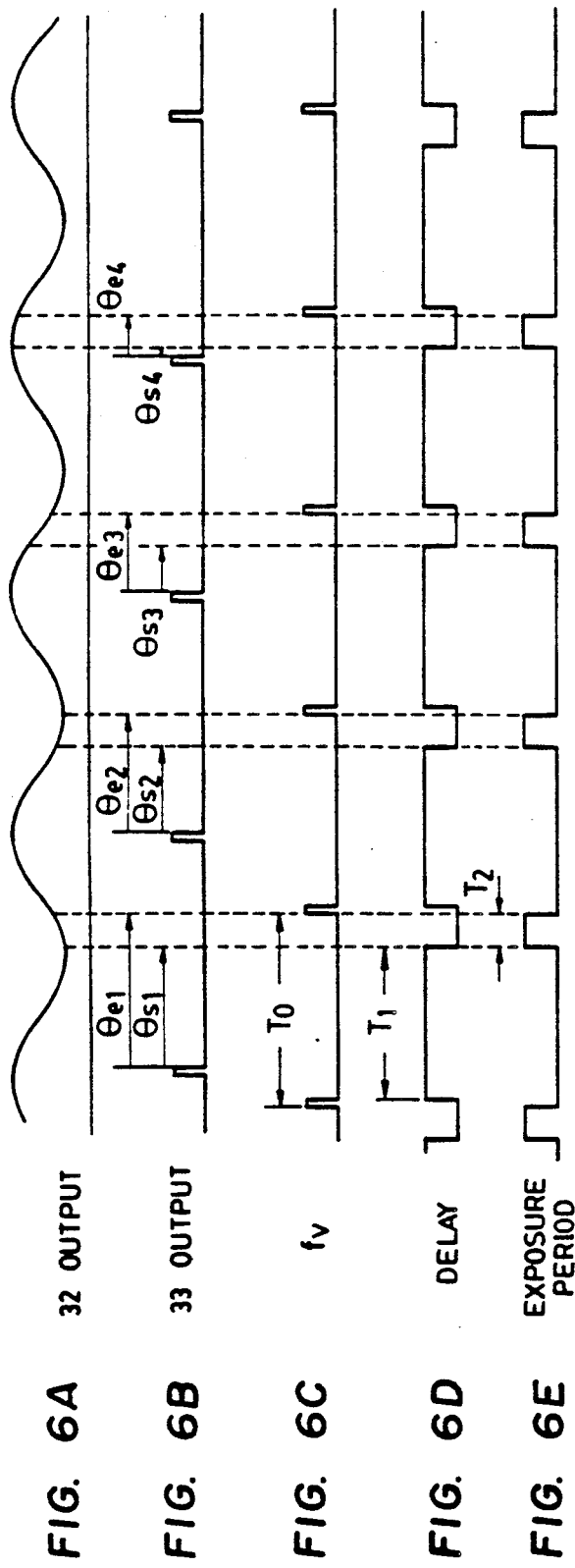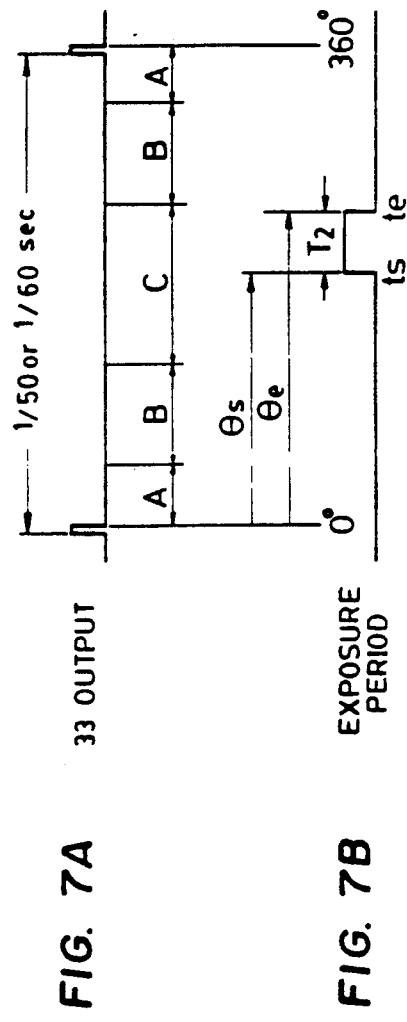

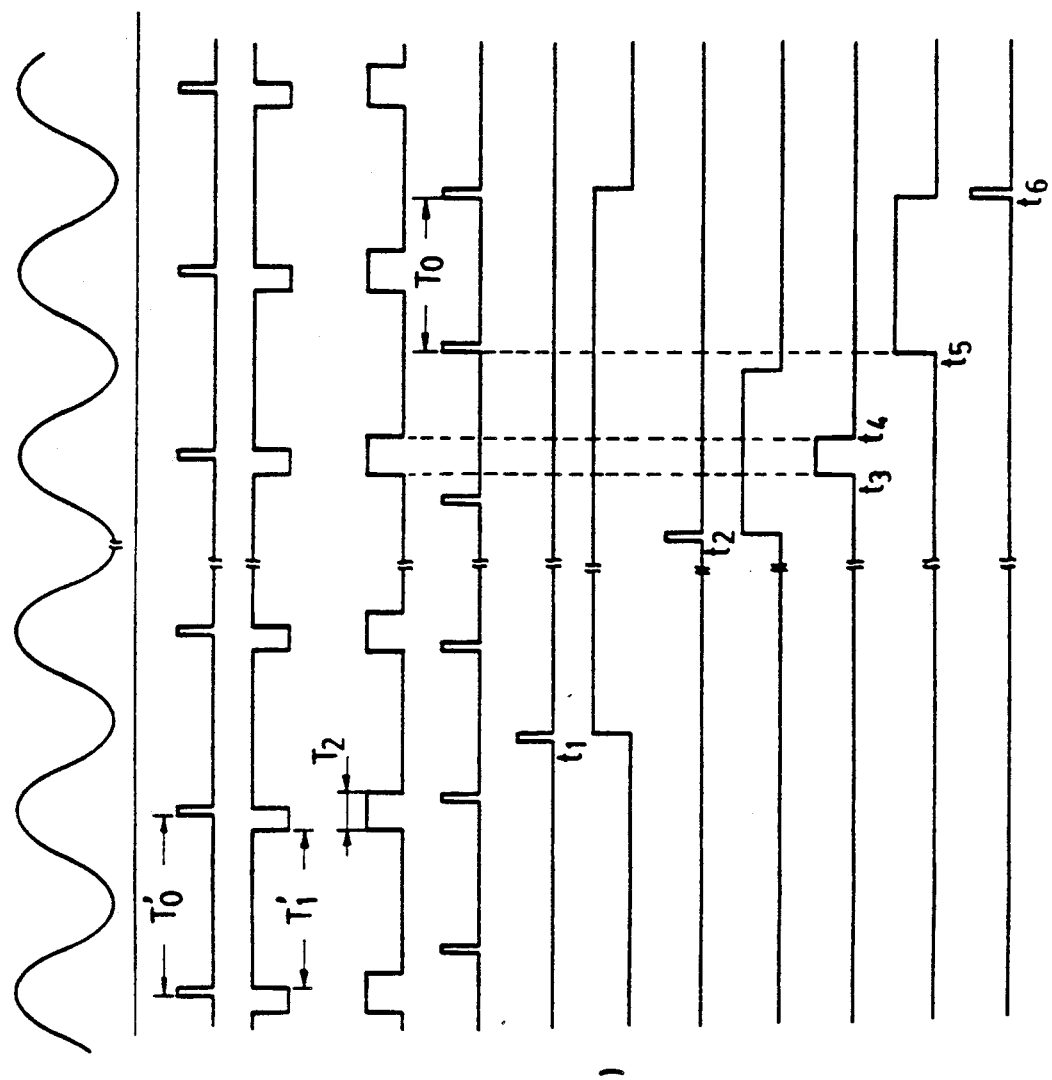

IMAGE PICKUP APPARATUS WITH WHITE BALANCE CONTROL BASED ON AMBIENT LIGHT FLICKER

This application is a continuation of application Ser. No. 003,771 filed Jan. 16, 1987, now U.S. Pat. No. 4,879,591.

BACKGROUND OF THE INVENTION

1. Field of the Invention

The present invention relates to an image pickup apparatus and, more particularly, to a color image pickup apparatus having signal compensation means for compensating an image signal in correspondence to color temperature changes of an image illumination source.

2. Description of the Related Art

Generally, in color television (TV) cameras, there are provided white balance control means and compensation means for compensating an image signal in correspondence to color temperature changes of an illumination source so that the signal becomes equivalent to one which is obtained under the illumination of a standard light source.

Moreover, though the exposure time of an image pickup tube or element for one TV field is fixed at, for example, 1/60 second under the NTSC system (1/50 second under the PAL system) in the conventional TV cameras, it has been proposed to equip the camera with means for setting the exposure time at a time period shorter than one field period (1/60 sec.). This technique enables a VTR (Video Tape Recorder) to reproduce a clear still picture without shaking of the images from scenes of rapidly moving objects recorded on the tape.

In FIG. 1, there is shown a circuit system for a TV camera equipped with such a means.

In the Figure, an image forming lens 1 is provided for forming an image of an object. A color image pickup element 3, e.g. a CCD (Charge Coupled Device), is provided with a color filter and is arranged to receive the object image formed by the lens 1. A shutter 2 is disposed between the lens 1 and the pickup element 3 to control the exposure of the pickup element 3 to the image light.

An amplifier circuit 4 is connected to receive the output of the pickup element 3. A color demodulation circuit 5 is connected to demodulate three primary color component signals R (Red), G (Green) and B (Blue) from the output of the amplifier circuit 4 in a known manner in response to a clock signal CK supplied from a control circuit 20. A luminous signal forming circuit 6 is connected to form a luminous signal Y based on the color component signals R, G and B output from the color demodulation circuit 5.

Gain controllable amplifier circuits 7 and 8 are connected to receive the color component signals R and B output from the color demodulation circuit 5, respectively. A subtraction circuit 9 is connected to subtract the output Y of the luminous signal forming circuit 6 from the output R of the amplifier circuit 7. Another subtraction circuit 10 is connected to subtract the output Y of the luminous signal forming circuit 6 from the output B of the amplifier circuit 8. A white balance control circuit 11 is connected to control the gain of the amplifier circuit 7 based on the output of the subtraction circuit 9 at the time of the white balance setting. Another white balance control circuit 12 is connected to control the gain of the amplifier circuit 8 based on the output of the subtraction circuit 10 at the time of the white balance setting. Signal level adjusting circuits 14 and 15 are connected to adjust the signal levels of the outputs of the subtraction circuits 9 and 10 based on level adjusting signals supplied from outputs $C_1$ and $C_2$ of a color temperature setting circuit 16, respectively. The color temperature setting circuit 16 is arranged to produce the level adjusting signals in accordance with a set color temperature. A modulation circuit 17 is connected to modulate a color subcarrier (fsc) with the outputs of the level adjusting circuits 14 and 15 according to a predetermined standard.

A luminous signal processing circuit 13 is connected to process and add synchronization signals SYNC. to the output of the luminous signal forming circuit 6 in a known manner. An addition circuit 18 is connected to add the outputs of the processing circuit 13 and the modulation circuit 17 to form a composite color TV signal.

A shutter drive circuit 19 is connected to drive the shutter 2. The control circuit 20 is connected to drive and control the image pickup element 3 and the drive circuit 19. The control circuit 20 may comprise a microcomputer and an oscillator. An exposure time setting circuit 21 is connected to set an exposure time for the shutter 2, to the control circuit 20.

In operation, the image pickup element 3 produces a color image signal when exposed to image light coming through the lens 1, and the open shutter 2. The image signal is repeatedly read out from the pickup element 3 by the control circuit 20 at a predetermined cycle (60 cps for the NTSC system). The output of the pickup element 3 is amplified in the amplifier circuit 4 and is supplied to the demodulation circuit 5 which demodulates the color component signals R, G and B from the output of the amplifier circuit 4 based on the clock signal CK supplied from the control circuit 20. These color component signals R, G and B are supplied to the luminous signal forming circuit 6 which forms the luminous signal Y based on the received color component signals R, G and B and according to the following equation:

$$Y = 0.30R + 0.59G + 0.11B$$

The luminous signal Y formed by the forming circuit 6 is supplied to the subtraction circuits 9 and 10 and to the processing circuit 13. The processing circuit 13 adds the synchronization signals SYNC from the control circuit 20 to the luminous signal Y and supplies the resulting signal to the addition circuit 18.

On the other hand, the color component signals R and B are respectively supplied through the amplifier circuits 7 and 8 to the subtraction circuits 9 and 10. These latter circuits subtract the luminous signal Y from the color component signals R and B to produce color difference signals R-Y and B-Y, respectively. Here, as is well known in the art, the white balance control circuits 11 and 12 respectively control the gains of the amplifier circuits 7 and 8 so that the levels of the color difference signals R-Y and B-Y produced by the subtraction circuits 9 and 10 become zero with respect to a white picture.

The color difference signals R-Y and B-Y are adjusted by the signal level adjusting circuits 14 and 15 based on level adjusting signals supplied in correspondence to the color temperature from the outputs $C_1$ and $C_2$, respectively, of the color temperature setting circuit 16. The color temperature and accordingly, the level adjusting signals are set in the setting circuit 16 in accordance with the object illumination light source. Thus, it becomes possible to correct the poorness in the reproducibility of a color vector due to the difference in the color temperatures of the light sources such as a fluorescent lamp, an incandescent lamp and a sun light.

After adjustment by the signal level adjusting circuits 14 and 15, the color difference signals R-Y and B-Y are supplied to the modulation circuit 17. The modulation output of the modulation circuit 17 is supplied to the addition circuit 18 which in turn produces the composite color TV signal based on the outputs of the processing circuit 13 and of the modulation circuit 17. The thus produced composite color TV signal can be recorded by the VTR or monitored by a monitor device.

In a normal usage, the shutter 2 is kept opened under the control of the control circuit 20 by the setting through the exposure time setting circuit 21 so that the exposure time of the pickup element 3 for one field becomes equal to one field period.

On the other hand, for special purposes, the exposure time can be set at a time period shorter than one field period through the setting circuit 21.

FIGS. 2A to 2C show a shutter timing arrangement where the exposure time for one field is set at a time period of $T_2$ which is shorter than the field period of $T_0$.

In this case, the control circuit 20 causes the pickup element 3 to output the image signal in synchronism with a vertical synchronization signal fv (FIG. 2A), but delays the exposure timing by a time period $T_1$ (FIG. 2B) so that the exposure period $T_2$, (which begins at the end of the delay period $T_1$), ends immediately before the commencement of the next field (FIG. 2C). Thus, the shutter drive circuit 19, under the control of the control circuit 20, drives the shutter 2 to expose the pickup element 3 at the time, and for the period, of $T_2$ shown in FIG. 2C.

The technique of controlling the exposure time of the image pickup element for a time period shorter than the field period is also important in still video cameras in which a video signal of one field or one frame is recorded on a magnetic video floppy disc during one rotation thereof.

In FIG. 3, there is shown a circuit system of a still video camera equipped with a shutter control means which controls the exposure time as described above.

In FIG. 3, the elements shown by the numerals used in FIG. 1 are the same in their structure and function as those shown in FIG. 1; and elements shown by the numerals used in FIG. 1, but with primes, correspond to those shown in FIG. 1.

As shown in FIG. 3, a magnetic video floppy disc 27 is mounted on an output spindle 23a of a disc rotating motor 23. A motor drive circuit 24 is connected to drive the motor 23 under the control of a control circuit 28.

A recording circuit 25 is connected to process the output of the addition circuit 18 into a recording signal. A magnetic head 26 is connected to record the output of the recording circuit 25 onto the disc 27.

A pulse generator 22 is arranged to generate a pulse signal PG at a predetermined rotation phase within each rotation of the disc 27. The pulse generator 22 is connected to supply the pulse signal PG to the motor drive circuit 24 and to the control circuit 28.

A trigger circuit 29 is connected to trigger the control circuit 28 to initiate a picture taking and recording operation.

Other than the above, the structure of the system is the same as that of the system shown in FIG. 1.

The operation of the system will now be explained with reference to FIGS. 4A to 4I.

When a power source for the system is turned on, the control circuit 28 begins to produce the synchronization signals SYNC including the vertical synchronization signal fv with a field period of $T_0$ (FIG. 4A). Then, when triggered through the trigger circuit 29 at a timing $t_1$ as shown in FIG. 4B, the control circuit 28 causes the motor drive circuit 24 to drive the motor 23 as shown in FIG. 4C. The motor drive circuit 24 drives the motor 23 based on the reference timing signals supplied by the control circuit 28, the pulse signal PG supplied by the pulse generator 22 and a frequency signal supplied by and indicative of the rotation speed of the motor 23 so that the motor rotates the disc 27 at a predetermined speed of 3,600 rpm and at a predetermined phase relationship relative to the vertical synchronization signal fv. The motor drive circuit 24 produces a servo-lock signal at a timing $t_2$ as shown in FIG. 4D when the rotation speed of the motor 23 has reached the predetermined speed of 3,600 rpm and the pulse signal PG has become synchronized with the vertical synchronization signal fv. In response thereto, the control circuit 28 internally produces a window pulse having a duration slightly longer than the field period of $T_0$, as is shown in FIG. 4E. Then, the control circuit 28 internally produces a delay pulse at a timing $t_3$ as shown in FIG. 4F in response to the first vertical synchronization signal fv falling in the duration of the window pulse of FIG. 4E. The delay pulse extends to a time $t_4$ as is shown in FIG. 4F. The control circuit 28 at the time $t_4$ causes the shutter drive circuit 19' to open the shutter 2' for an exposure period from the time $t_4$ to a time $t_5$ as shown in FIG. 4G. This exposure period is predeterminately set through the exposure time setting circuit 21' and corresponds to the remaining portion of the field period $T_0$, taking therefrom the delay period from the time $t_3$ to the time $t_4$. At the time $t_5$, the control circuit 28 triggers the recording circuit 25 which in turn records through the head 26 onto the disc 27 while forming a circular track thereon. This recording of the signal supplied from the addition circuit 18 is carried out for the field period from the time $t_5$ to a time $t_6$ as shown in FIG. 4H. At the time $t_6$, the control circuit 28 produces a termination pulse as shown in FIG. 4I and deactivates the motor drive circuit 24 as shown in FIG. 4C.

Other than the above, the operation of the system of FIG. 3 is the same as that of the system shown in FIG. 1.

The above described cameras of FIG. 1 and FIG. 3 can operate satisfactorily when the object whose picture is being taken is illuminated from a light source whose color temperature does not change in time, e.g., sun light, an incandescent lamp, or the like.

However, in the case of an illuminating light source whose color temperature changes in time over a certain period, e.g., a fluorescent lamp, a problem may arise if the exposure time is short. That is, in the case where the exposure time is no shorter than the field period (1/60 sec. in NTSC system), e.g., 1/30 sec., 1/15 sec. or longer, the system works well with a color temperature fixedly set in the color temperature setting circuit 16. This is because the periodic change in the color temperature of the light source is averaged for the exposure time. However, in the case where the exposure time is shorter than the field period, e.g., 1/250 sec., 1/500 sec. or shorter, the color temperature for the exposure period changes depending upon the phase of the exposure timing relative to the cycle of the light source color temperature variations. In this case, the color temperature may vary in the order of a few hundred degrees in actual measurement values. Under this condition, if the color temperature is fixedly set in the color temperature setting circuit 16, the hue becomes different in each field or picture frame and the picture images become unsightly.

SUMMARY OF THE INVENTION

According to the present invention, there is provided an image pickup apparatus for picking up an image under an illumination whose color temperature changes periodically, which comprises image pickup means, detection means and control means. The image pickup means produces an image signal in response to a received image. The detection means detects the change in the color temperature of the illumination. The control means is arranged to control the image pickup means based on the output of the detection means to produce an image signal corresponding to that produced by an illumination whose color temperature remains constant.

In a first preferred embodiment, the control means is arranged to respond to the detection means in a manner to produce a compensation of the image signal produced by the pickup means in accordance with a detected phase relationship between the image pickup timing and the color temperature change.

The control means of the first embodiment preferably detects a phase relationship between a timing of image pickup by the pickup means and a detected change in the color temperature of the illumination. The control means compensates the image signal produced by the pickup means in accordance with the detected phase relationship between the image pickup timing and the color temperature change.

In the first preferred embodiment, the control means controls the timing of image pickup by the pickup means. The control means preferably includes timing signal generation means for generating timing signals having a predetermined cycle, and means to apply a selected timing signal to the pickup means to define the timing of image pickup. The detection means is arranged to detect the phase relationship between the timing of the image pickup and the change in the color temperature of the illumination.

In a second preferred embodiment the control means is arranged to respond to the detection means in a manner to cause the pickup means to pick up the image at a predetermined phase of the change in color temperature of the illumination.

The control means in the second embodiment preferably comprises compensation means for compensating the image signal produced by the pickup means with a compensation value.

The control means preferably includes timing signal generation means for generating timing signals in synchronism with the predetermined phase of the change in the color temperature of the illumination and means for applying each of the timing signals to control the timing of image pickup by the pickup means. The control means preferably further includes output means for outputting one of the timing signals generated by the generation means in response to the operation of a manually operated trigger means to trigger the pickup means.

The control means also preferably includes means for adjusting the phase relationship between the timing of the image pickup by the pickup means and the change in the color temperature of the illumination.

The control means preferably includes means for adjusting the phase relationship between the timing of the image pickup by the pickup means and the change in the color temperature of the illumination.

In each embodiment the detection means preferably includes a sensing element for producing an output signal which varies in correspondence to the change in color temperature of the illumination. The sensing element preferably includes a light sensor which is responsive to the change in the luminosity of the illumination correlated to the color temperature.

The apparatus of each embodiment preferably comprises means for adjusting a period of image pickup by the image pickup means, which period may be shorter than one TV field period.

The image pickup means of each embodiment preferably includes a color image pickup element and exposure means for exposing the pickup element to an image light to pick up the image. The exposure means preferably includes a shutter device disposed in front of the pickup element.

The apparatus of each embodiment is also preferably constructed as or in a camera.

Thus, by the present invention, it becomes possible to avoid the fluctuation in the hue between the fields or the picture frames at the time of the image picking up under the illumination whose color temperatures periodically changes.

Moreover, by the present invention, it is also possible to appropriately compensate the image signal in accordance with the change in the color temperature of the illumination at the time of the image picking up under the illumination whose color temperatures periodically changes.

The above and other aspects, features and advantages of the present invention will become apparent from the following detailed description of the preferred embodiments referring to the accompanied drawings.

BRIEF DESCRIPTION OF THE DRAWINGS

FIGS. 2A to 2C are timing charts showing the operation of the camera circuit system of FIG. 1;

FIGS. 4A to 4I are timing charts showing the operation of the camera circuit system of FIG. 3;

FIGS. 6A to 6E are timing charts showing the operation of the camera circuit system of FIG. 5;

FIGS. 7A and 7B are timing charts showing the manner of signal compensation in accordance with color temperature in the TV camera circuit system of FIG. 5;

FIGS. 11A to 11L are timing charts showing the operation of the camera of FIG. 10.

DETAILED DESCRIPTION OF THE PREFERRED EMBODIMENTS

A first embodiment of the present invention will be explained herein below with reference to FIGS. 5 to 7B.

Figure 1:
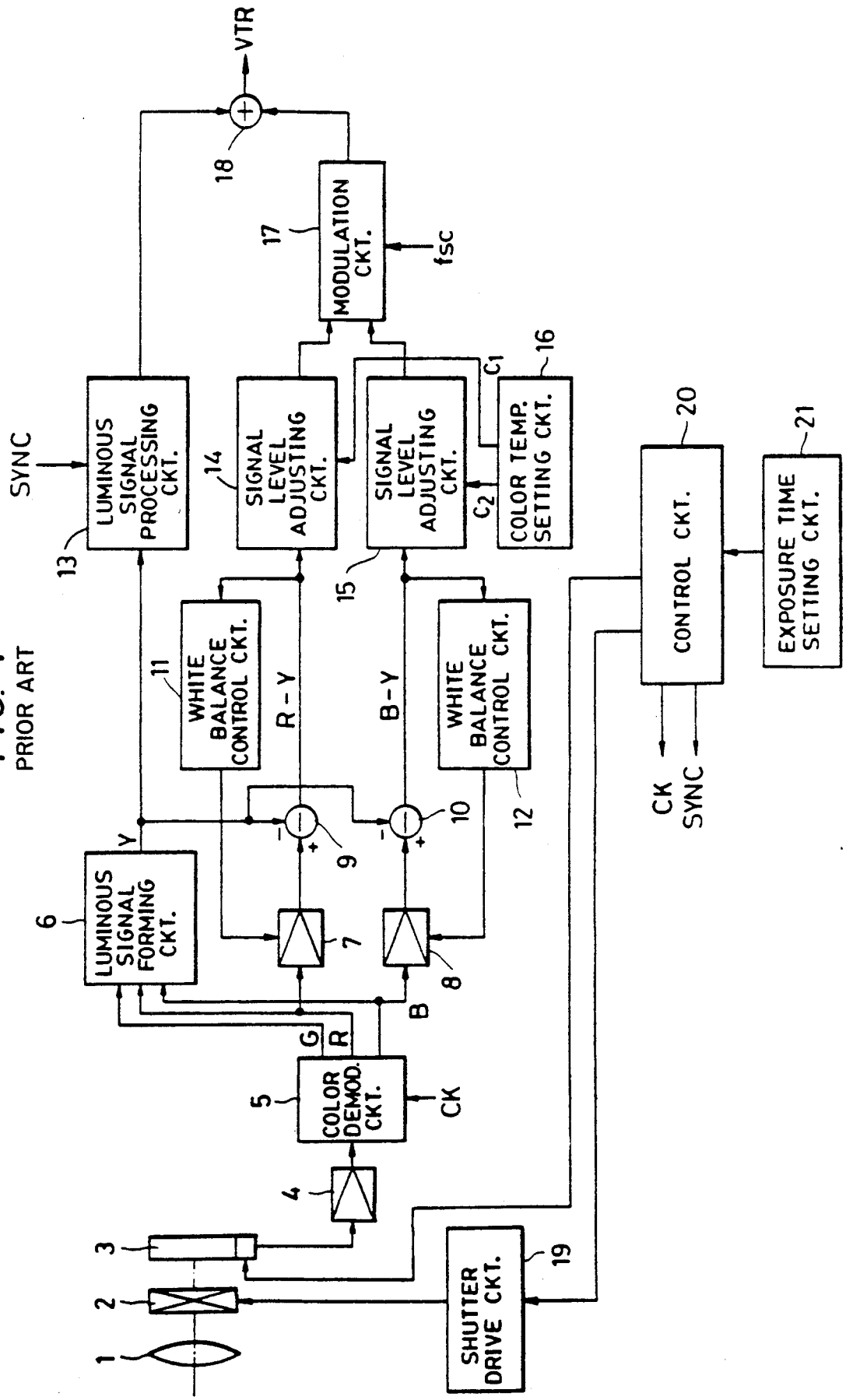
FIG. 1 is a block diagram of a TV camera circuit system in which the present invention may be used.
Figure 5:
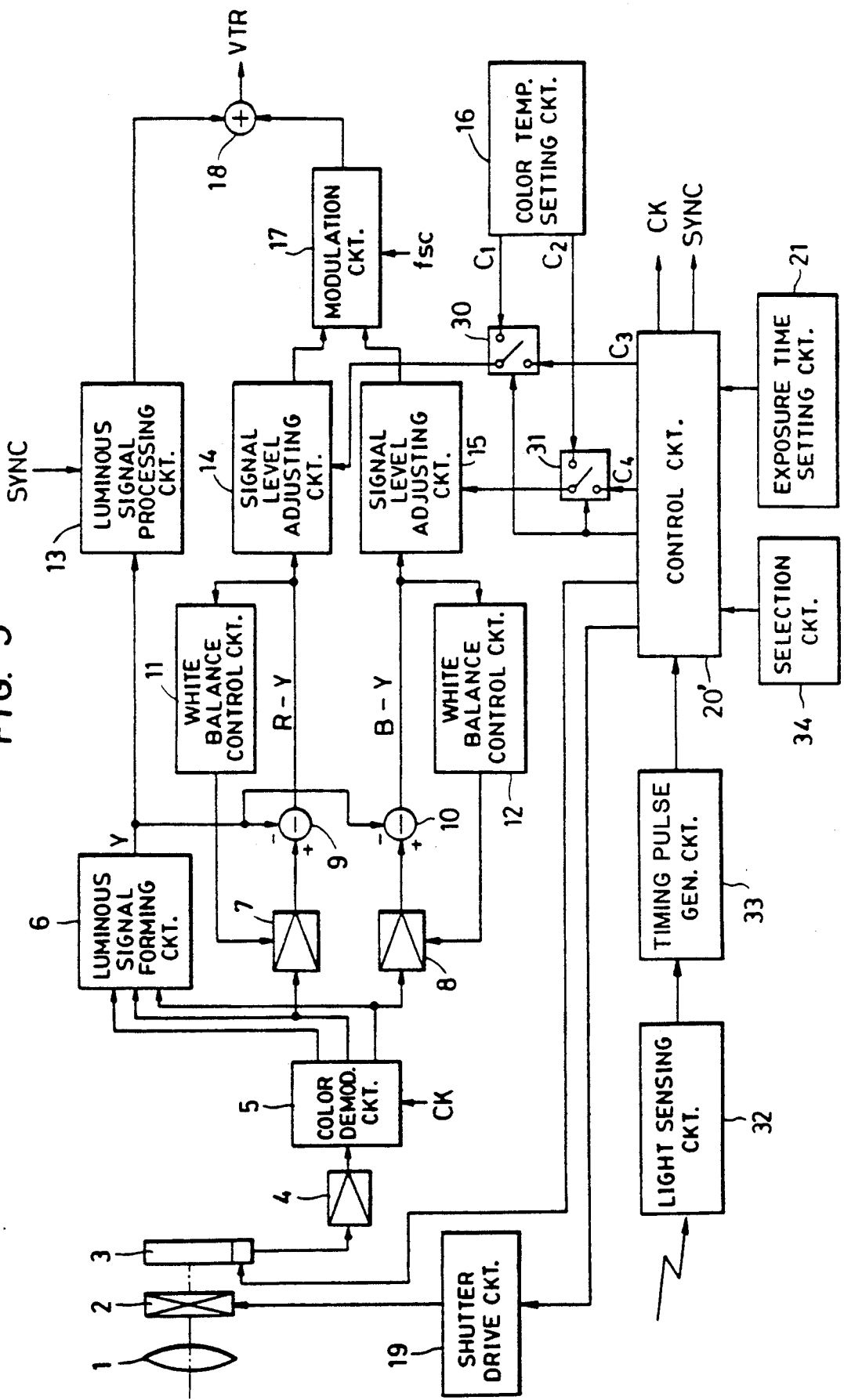
FIG. 5 is a block diagram of a TV camera circuit system similar to FIG. 1 but incorporating a first embodiment of the present invention.

In FIG. 5, the elements shown by the numerals used in FIG. 1 are the same in their structure and operation as those shown in FIG. 1; and an element shown by the numeral used in FIG. 1, but with a prime, corresponds to that shown in FIG. 1.

Switch circuits 30 and 31 are connected to be controlled by a control circuit 20' to select for the signal level adjusting circuits 14 and 15, the level adjusting signals supplied from the outputs $C_1$ and $C_2$ of the color temperature setting circuit 16, or the level adjusting signals supplied from outputs $C_3$ and $C_4$ of the control circuit 20', respectively.

A light sensing circuit 32 including a photo-sensor is provided to produce an output signal which varies in correspondence to the change in the luminosity of the illumination of the object whose picture is being taken. The output signal from the sensing circuit 32 is correlated to the color temperature of the illumination.

A timing pulse generator circuit 33 is connected to generate a timing pulse in response to the output signal of the sensing circuit 32.

The control circuit 20' has a function, in addition to that of the control circuit 20 shown in FIG. 1, to produce at its outputs $C_3$ and $C_4$ the level adjusting signals for the signal level adjusting circuits 14 and 15 in accordance with a phase relationship between the timing of exposure of the pickup element 3 and the change in the color temperature of the illumination sensed through the sensing circuit 32, and to control the switch circuits 30 and 31. The details of the specific arrangements for producing the signals $C_3$ and $C_4$ are not part of the invention and any suitable circuit arrangement e.g., one using read only memories and microprocessors, may be used, as will be readily apparent to those skilled in the art.

A selection circuit 34 is connected to designate the kind of the light source to the control circuit 20'.

Other than the above, the structure of the system is the same as that of the system shown in FIG. 1.

The operation of the system will now be explained herein below with reference to FIGS. 6A to 7B.

When the object whose picture is taken is illuminated from a light source such as fluorescent lamp, whose color temperature changes periodically, the light sensing circuit 32 produces an output signal corresponding to the change in the luminosity of the illumination which is correlated to its color temperature, as shown in FIG. 6A. The timing pulse generation circuit 33 produces a pulse signal in response to a specific level of the output signal of the sensing circuit 32 in each cycle thereof. In this embodiment, the timing pulse generation circuit 33 is arranged to produce a pulse signal in response to the peak level of the output signal of the sensing circuit 32 in each cycle thereof, as shown in FIG. 6B. The pulse signal produced by the timing pulse generation circuit 33 is supplied to the control circuit 20'.

When the exposure time set in the setting circuit 21 is at a period shorter than the field period, the control circuit 20' causes the pickup element 3 to output the image signal in synchronism with the vertical synchronization signal fv (FIG. 6C). The control circuit 20' also delays the exposure timing by the time period $T_1$ (FIG. 6D) so that the exposure period $T_2$ ends immediately before the commencement of the next field (FIG. 6E).

In this condition, when the type of light source or illumination is designated through the selection circuit 34, (e.g., in this case, a fluorescent lamp), the control circuit 20' causes the switch circuits 30 and 31 to connect the control inputs of the level adjusting circuits 14 and 15 with the control outputs $C_3$ and $C_4$ of the control circuit 20', respectively. At the same time, the control circuit 20' detects, as is shown in FIG. 6B, the phase relationship of the commencement ($^\theta S1$, $^\theta S2$, $^\theta S3$, $^\theta S4$, ...) and the termination ($^\theta e1$, $^\theta e2$, $^\theta e3$, $^\theta e4$, ...) of the exposure periods $T_2$ relative to the outputs of the timing pulse generation circuit 33, respectively, and produces at its outputs $C_3$ and $C_4$ the level adjusting signals for the signal level adjusting circuits 14 and 15 for the appropriate color temperature compensation based on the detected phase relationships. The manner in which this is done will now be explained.

In this embodiment, the control circuit 20' divides one period of the output of the generation circuit 33 (i.e., one cycle of luminosity and color temperature variation of the fluorescent lamp) into five zones according to the luminosity (the color temperatures), that is, higher luminosity ranges (higher color temperature ranges) A, intermediate luminosity ranges (intermediate color temperature ranges) B and a lower luminosity range (lower color temperature range) C, as is shown in FIG. 7A. The control circuit 20' detects in which of the ranges the phases $\theta s$ and $\theta e$ of the commencement $t_s$ and the termination $t_e$ of the exposure period $T_2$ (shown in FIG. 7B) relative to the output of the generation circuit 33 (phase 0°) fall respectively. As an algorithm for determining the color temperature compensation level, when the entire exposure period $T_2$ falls in one of the ranges A, B and C, the control circuit 20' determines the compensation level based on the luminosity of the range into which the exposure period $T_2$ falls and when the exposure period $T_2$ extends over plural ranges, the control circuit 20' determines the compensation level based on the average of the luminosities of the ranges over which the exposure period $T_2$ extends.

In the manner explained above, the control circuit 20' produces the level adjusting signals for each field based on the phase relationship of each exposure period $T_2$ relative to the pulse signal output from the generation circuit 33 (shown in FIG. 6B). The produced level adjusting signals are respectively supplied to the adjusting circuits 14 and 15 through the switch circuits 30 and 31 and these adjusting circuits 14 and 15 adjust the levels of the color difference signals R-Y and B-Y supplied from the subtraction circuits 9 and 10 according to the adjusting signals supplied from the switch circuits 30 and 31, respectively.

Though, in this embodiment, the light source is the fluorescent lamp driven at a rate of 50 Hz (or 60 Hz), it is possible to cope with other different light sources by designating the kind of the light source used through the selection circuit 34.

Other than the above, the function of the system is the same as that of the system shown in FIG. 1.

Here, as another algorithm for determining the color temperature compensation level, the control circuit 20' may be arranged to determine the compensation level based on the proportions of the exposure period $T_2$ to the ranges A, B and C of FIG. 7A.

Moreover, the number of luminating (i.e., color temperature) ranges may, for purposes of simplification, be chosen to be two (i.e., A and B) instead of three (i.e., A, B and C). Alternatively, more than three ranges may be used for more precise signal level compensation, or in consideration of much shorter exposure periods.

Though, in the above described embodiment, the shutter device 2 is used for obtaining an exposure period shorter than the field period, it is possible to obtain a substantial exposure period shorter than the field period by controlling the driving manner of the image pickup element 3 as is disclosed in U.S. patent application Ser. No. 596,404, Apr. 3, 1984 (corresponding Japanese Pat. Laid Open No. 185475/1984) of the present assignee.

Moreover, when the camera system is supplied with the same AC power by which the light source is driven, the change in the luminosity and hence the color temperature of the illumination emitted by the light source may be detected directly from the AC power signal by the control circuit 20' or other suitable means instead of the light sensing circuit 32.

The second embodiment of the present invention will now be explained with reference to FIGS. 8 to 9K.

Figure 3:
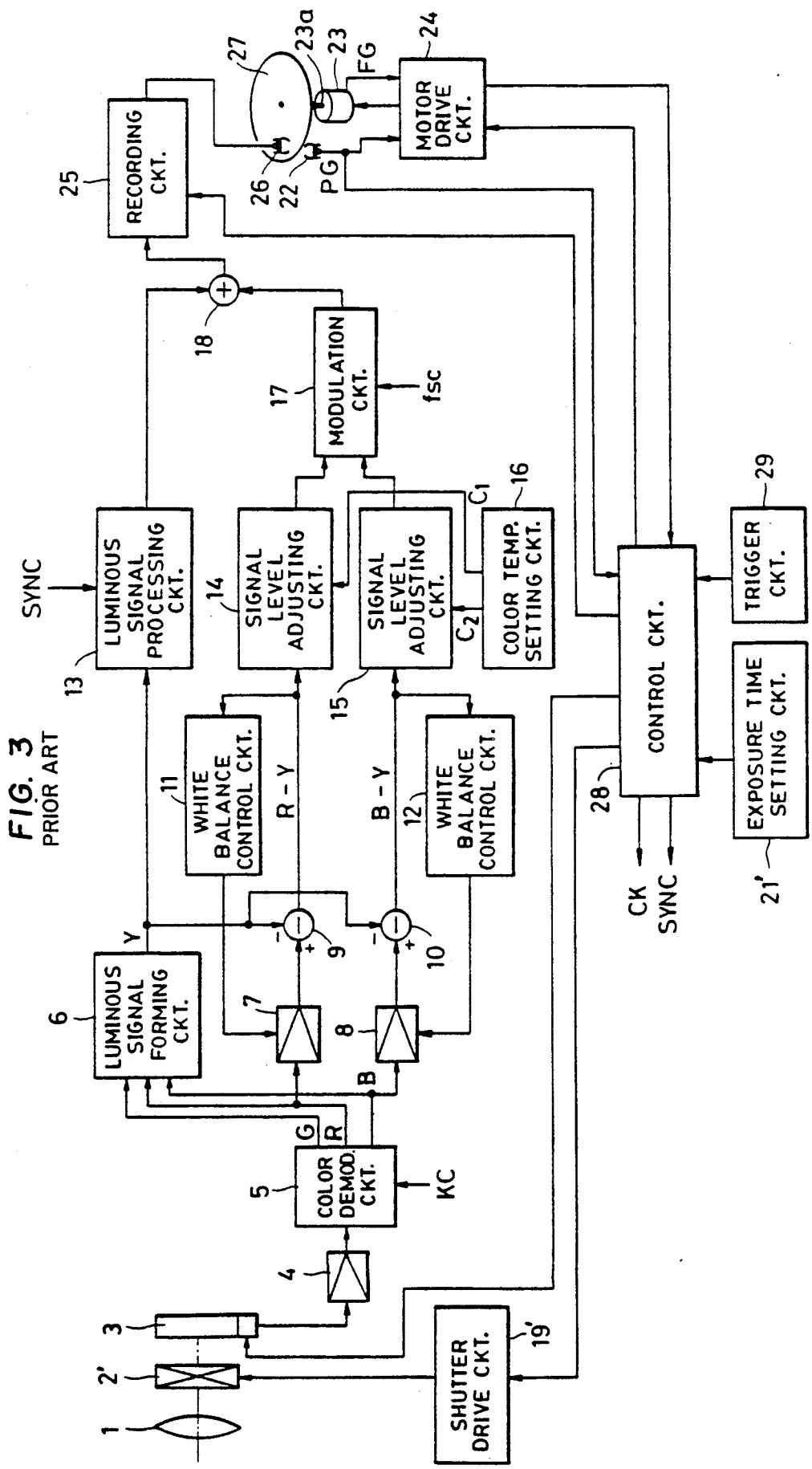
FIG. 3 is a block diagram of a still video recording camera circuit system in which the present invention may be used.
Figure 8:
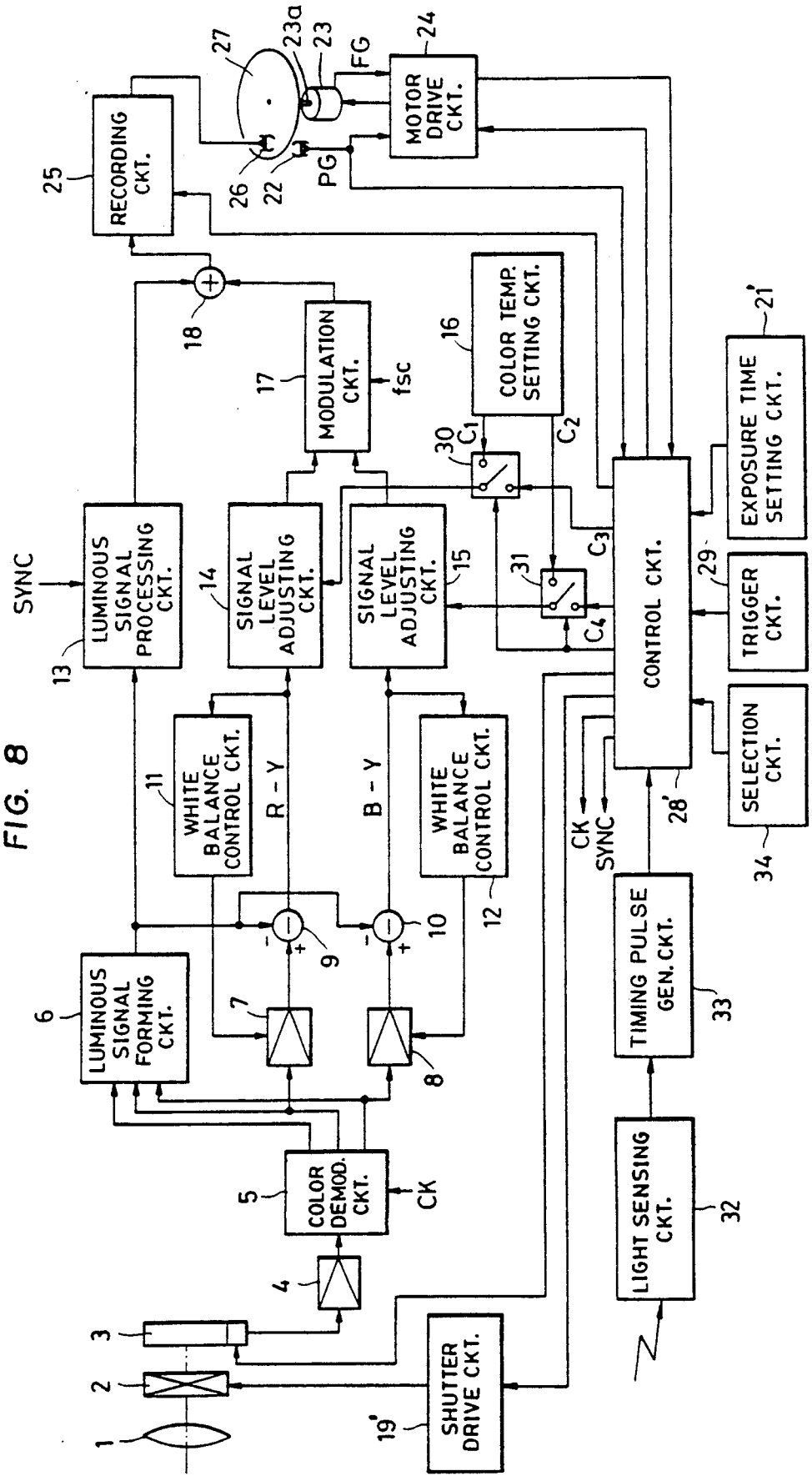
FIG. 8 is a block diagram of a still video recording camera electrical circuit system in which a second embodiment of the present invention is used.
Figure 9:
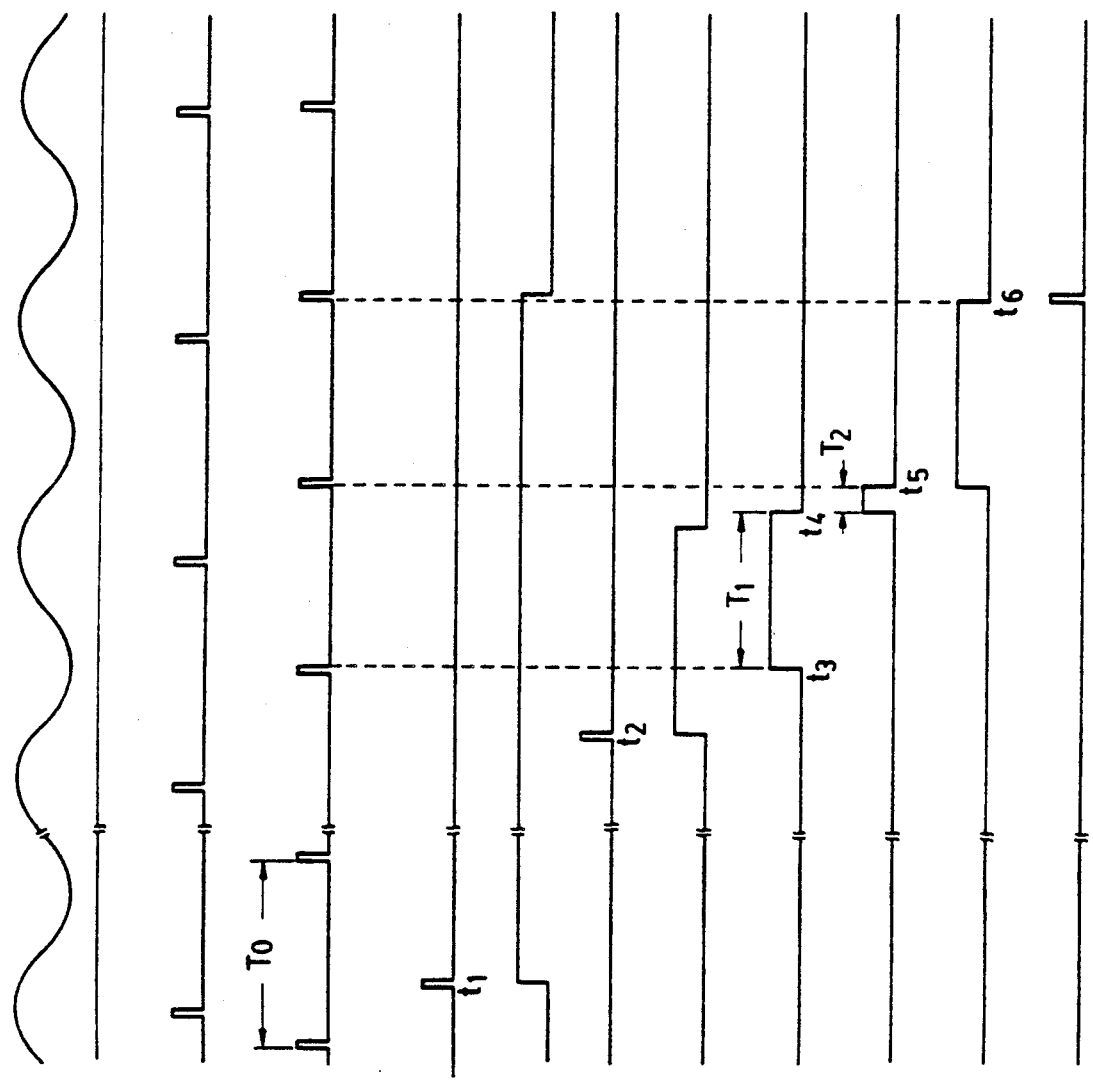
FIGS. 9A to 9K are timing charts showing the operation of the camera of FIG. 8.

In FIG. 8, the system comprises, in addition to the structure of the system shown in FIG. 3, the circuits 31 to 34 shown in FIG. 5. Therefore, in FIG. 8, the elements shown by the numerals used in FIGS. 1, 3 and 5 are the same in their structure and operation as those shown in these Figures; and an element shown by the numeral used in FIG. 3, but with a prime, corresponds to that shown in FIG. 3.

A control circuit 28' has a function, in addition to that of the control circuit 28 shown in FIG. 3, to produce at its outputs $C_3$ and $C_4$ the level adjusting signals for the signal level adjusting circuits 14 and 15 in accordance with a phase relationship between the timing of exposure of the pickup element 3 and the change in the color temperature of the illumination sensed through the sensing circuit 32 and to control the switch circuits 30 and 31. The control circuit 28' determines the signal compensation level and produces the level adjusting signals in the same way as that of the control circuit 20' in FIG. 5 and explained with reference to FIGS. 7A and 7B.

Other than the above, the structure of the system is the same as that of the system shown in FIG. 3.

The operation of the system of FIG. 8 will now be explained with reference to FIGS. 9A to 9K.

Under the illumination from a light source such as a fluorescent lamp, whose color temperature changes periodically, the light sensing circuit 32 produces an output signal corresponding to the change in the luminosity of the illumination which is correlated to its color temperature, as shown in FIG. 9A. The timing pulse generation circuit 33 produces a pulse signal in response to the peak level of the output signal of the sensing circuit 32 in each cycle thereof, as shown in FIG. 9B. The pulse signal produced by the generation circuit 33 is supplied to the control circuit 28'.

In this condition, when designated through the selection circuit 34 the kind of the light source, that is, a fluorescent lamp in this case, the control circuit 28' causes the switch circuits 30 and 31 to connect the control inputs of the level adjusting circuits 14 and 15 with the control outputs $C_3$ and $C_4$ of the control circuit 28' respectively.

The control circuit 28' also causes the pickup element 3 to output the image signal in synchronism with the vertical synchronization signal fv (FIG. 9C). Then, when triggered through the trigger circuit 29 at a time $t_1$ as shown in FIG. 9D, the control circuit 28' causes the motor drive circuit 24 to drive the motor 23 as shown in FIG. 9E. The motor drive circuit 24 drives the motor 23 so that the motor 23 rotates the disc 27 at the predetermined speed of 3,600 rpm and at the predetermined phase relationship relative to the vertical synchronization signal fv. The motor drive circuit 24 produces the servo-lock signal at a time $t_2$ as shown in FIG. 9F when the rotation speed of the motor 23 has reached the predetermined speed of 3,600 rpm and the pulse signal PG generated by the pulse generator 22 has become synchronized with the vertical synchronization signal fv. In response thereto, the control circuit 28' internally produces a window pulse having a duration slightly longer than the field period $T_0$, as is shown in FIG. 9G. Then, the control circuit 28' internally produces a delay pulse at a time $t_3$ as shown in FIG. 9H in response to the first vertical synchronization signal fv which occurs in the duration of the window pulse of FIG. 9G. The delay pulse extends for a period of $T_1$ to a time $t_4$ as shown in FIG. 9H. At the time $t_4$, the control circuit 28' causes the shutter drive circuit 19' to open the shutter 2' for an exposure period of $T_2$ from the time $t_4$ to a time $t_5$ as shown in FIG. 9I. This exposure period $T_2$ is predeterminately set through the exposure time setting circuit 21' and corresponds to the remaining portion of the field period $T_0$, taking therefrom the delay period $T_1$ from the time $t_3$ to the time $t_4$. At the time $t_5$, the control circuit 28' produces the level adjusting signals based on the phase relationship of the exposure period $T_2$ relative to the pulse signal output from the generation circuit 33 (shown in FIG. 9B) and in the same manner as explained with reference to FIGS. 7A and 7B in the first embodiment. The thus produced level adjusting signals are respectively supplied to the adjusting circuits 14 and 15 through the switch circuits 30 and 31. Thus, the adjusting circuits 14 and 15 adjust the levels of the color difference signals R-Y and B-Y supplied from the subtraction circuits 9 and 10 during the field period from the time $t_5$ to the time $t_6$ as shown in FIG. 9J, according to the adjusting signals supplied from the switch circuits 30 and 31, respectively.

On the other hand, at the time $t_5$, the control circuit 28' triggers the recording circuit 25 which in turn records through the head 26 onto the disc 27 while forming a circular track thereon. The recording circuit 25 records the signal supplied from the addition circuit 18 for the field period from the time $t_5$ to the time $t_6$ as shown in FIG. 9J. At the time $t_6$, the control circuit 28' produces a termination pulse as shown in FIG. 9K and deactivates the motor drive circuit 24 as shown in FIG. 9E.

Other than the above, the operation of the system is the same as that of the system shown in FIG. 3.

Moreover, the same modifications as those to the first embodiment are also applicable to the present embodiment.

The third embodiment of the present invention will now be explained with reference to FIGS. 10 to 11L.

Figure 10:
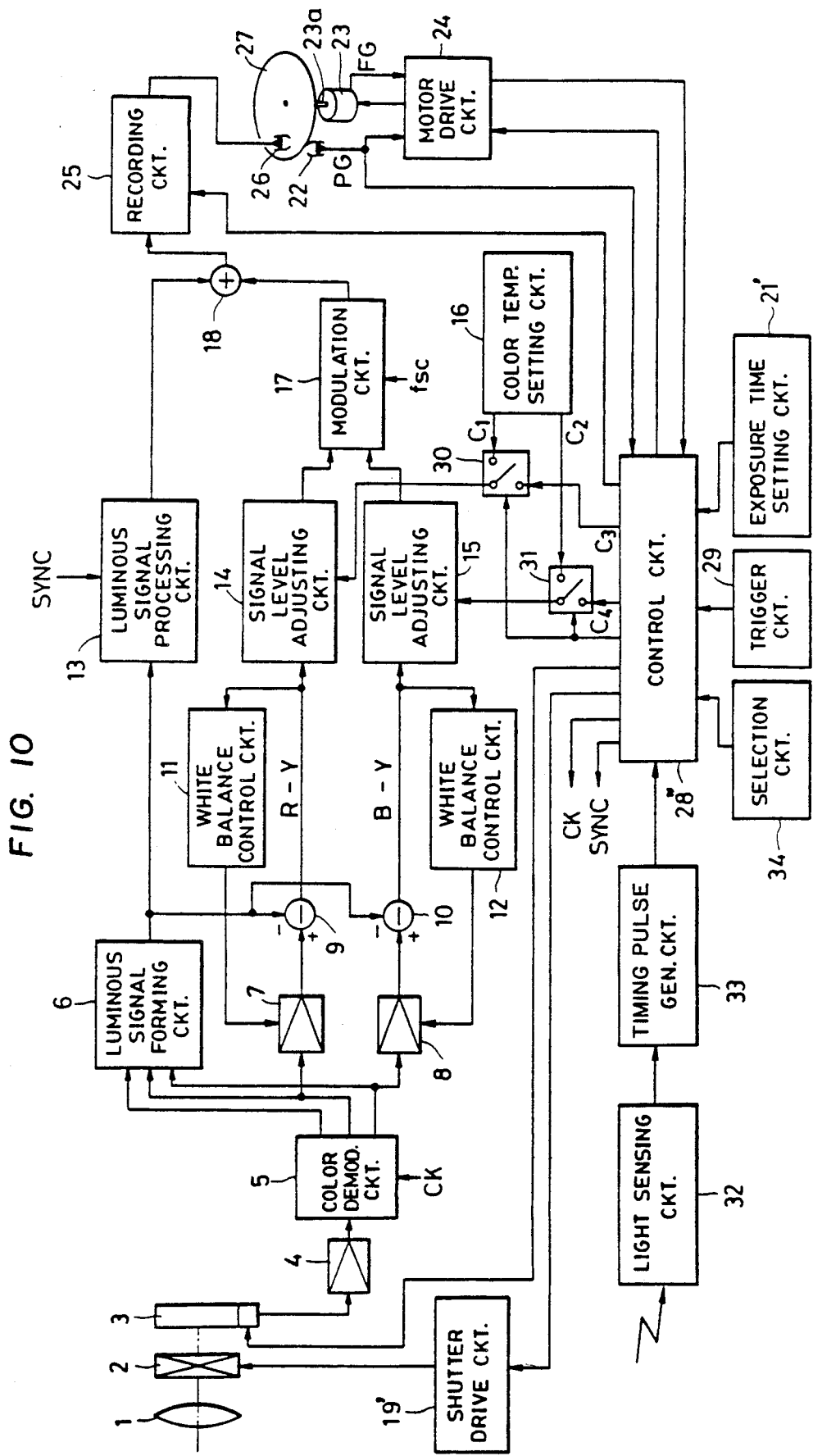
FIG. 10 is a block diagram of a still video recording camera electrical circuit system in which a third embodiment of the present invention is used.

The system shown in FIG. 10 comprises, in addition to the structure of the system shown in FIG. 3, the circuits 31 to 34 shown in FIG. 5. Therefore, in FIG. 10, the elements shown by the numerals used in FIGS. 1, 3 and 5 are the same in structure and operation as those shown in these Figures; and an element shown by the numeral used in FIG. 3, but with a double prime, corresponds to that shown in FIG. 3.

A control circuit 28'' has a function, in addition to that of the control circuit 28 shown in FIG. 3, to control the exposure timing of the pickup element 3 at a predetermined phase relative to the change in the color temperature of the illumination sensed through the sensing circuit 32. Moreover, the control circuit 28'' determines the signal compensation level in accordance with the kind of the light source and with the phase relationship of the exposure timing relative to the color temperature change. Also, the control circuit 28'' produces at its outputs $C_3$ and $C_4$, the level adjusting signals for the signal level adjusting circuits 14 and 15 in accordance with the phase relationship between the exposure of the pickup element 3 and the change in the color temperature of the illumination sensed through the sensing circuit 32.

Other than the above, the structure of the system of FIG. 10 is the same as that of the system shown in FIG. 3.

The operation of the system of FIG. 10 will now be explained with reference to FIGS. 11A to 11L.

Under illumination from a light source such as a fluorescent lamp, whose color temperature changes periodically, the light sensing circuit 32 produces an output signal corresponding to the change in the luminosity of the illumination, which is correlated to its color temperature, as shown in FIG. 11A. The timing pulse generation circuit 33 produces a pulse signal in response to the peak level of the output signal of the sensing circuit 32 in each cycle thereof, as shown in FIG. 11B. The pulse signal produced by the generation circuit 33 is supplied to the control circuit 28''.

In this condition, when the kind of light source (e.g., a fluorescent lamp in this case), is designated through the selection circuit 34, the control circuit 28'' produces predetermined level adjusting signals at its outputs $C_3$ and $C_4$. Also the color temperature setting circuit 16 causes the switch circuits 30 and 31 to connect the control inputs of the level adjusting circuits 14 and 15 with the control outputs $C_3$ and $C_4$ of the control circuit 28'', respectively. Moreover, the control circuit 28'' begins to internally produce a reference exposure timing pulse (FIG. 11D) in response to each pulse output of the generation circuit 33 (FIG. 11B) while leaving a delay (FIG. 11C) therebetween. The time period $T'_1$ of the delay pulse (FIG. 11C) is selected to have the center of the reference exposure timing pulse (FIG. 11D) coincide with the pulse output of the generation circuit 33 (FIG. 11B). Each reference exposure timing pulse has a time period of $T_2$ which is predeterminately set through the exposure time setting circuit 21'.

The control circuit 28'' causes the pickup element 3 to output the image signal in synchronism with the vertical synchronization signal fv (FIG. 11E). Then, when triggered through the trigger circuit 29 at a time $t_1$ as shown in FIG. 11F, the control circuit 28'' causes the motor drive circuit 24 to drive the motor 23 as shown in FIG. 11G. The motor drive circuit 24 drives the motor 23 so that the motor 23 rotates the disc 27 at the predetermined speed of 3,600 rpm and at the predetermined phase relationship relative to the vertical synchronization signal fv. The motor drive circuit 24 produces the servo-lock signal at a time $t_2$, as shown in FIG. 11H, when the rotation speed of the motor 23 has reached the predetermined speed of 3,600 rpm and the pulse signal PG generated by the pulse generator 22 has become synchronized with the vertical synchronization signal fv. In response thereto, the control circuit 28'' internally produces a window pulse (FIG. 11I) having a duration slightly longer than the period $T'_0$ of the pulse output of the generation circuit 33 shown in FIG. 11B. Then, in response to the reference exposure timing pulse (FIG. 11D) which occurs in the duration of the window pulse of FIG. 11I, the control circuit 28'' causes the shutter drive circuit 19' to open the shutter 2' for the preset exposure period $T_2$ from a time $t_3$ to a time $t_4$ as shown in FIG. 11J.

The control circuit 28'', at a time $t_5$, as shown in FIG. 11K, then triggers, in response to the first vertical synchronization signal fv after the completion of the exposure of the pickup element 3, the recording circuit 25 which in turn records through the head 26 on the disc 27 the signal supplied from the addition circuit 18 for the field period $T_0$ from the time $t_5$ to a time $t_6$.

In this case, the control circuit 28'' produces the predetermined level adjusting signals based on the selected kind of the light source (the fluorescent lamp) and the phase relationship of the exposure period $T_2$ relative to the color temperature change. The produced level adjusting signals are respectively supplied to the adjusting circuits 14 and 15 through the switch circuits 30 and 31. Thus, the adjusting circuits 14 and 15 adjust the levels of the color difference signals R-Y and B-Y supplied from the subtraction circuits 9 and 10 during the field period from the time $t_5$ to the time $t_6$ as shown in FIG. 11K, according to the adjusting signals supplied from the switch circuits 30 and 31, respectively.

At the time $t_6$, the control circuit 28'' produces a termination pulse as shown in FIG. 11L and deactivates the motor drive circuit 24 as shown in FIG. 11G.

Other than the above, the function of the system of FIG. 10 is the same as that of the system shown in FIG. 3.

Moreover, the same modifications as described above for the first embodiment may, to the extent that they are compatible with the embodiment of FIG. 10, be applied to that embodiment.

Furthermore, the control circuit 28'' may comprise a table of various predetermined signal level adjusting or control values each of which can be selectively read out depending upon the kind of the light source, the length of the exposure period and the phase relationship of the exposure period relative to the change in the color temperature of the illumination from the light source. On the other hand, a predetermined relationship may be set between the length of the exposure period and the signal level adjusting values.

As can be readily appreciated from the foregoing description, according to the present invention, it becomes possible to avoid the fluctuation in the hue between the fields or the picture frames at the time of image pickup or picture taking where the object whose picture is being taken is illuminated by an illumination source of periodically varying color temperature.

Moreover, according to the present invention, in another aspect, it becomes possible to appropriately compensate the image signal in accordance with the change in the color temperature of the illumination at the time of the image pickup under the illumination whose color temperatures periodically changes.

The present invention need not necessarily be restricted to the above described embodiment but many modifications can be made within the scope of the invention claimed in appended claim.

I claim:

1. An image pickup apparatus comprising:
   image pickup means for producing an image signal in response to a received image;
   detecting means for detecting (1) a phase of a flicker component associated with a light source, and (2) a relationship between the detected phase of the flicker component and a timing of producing the image pickup signal by said image pickup means; and
   control means for controlling a white balance of the output of said image pickup means based on the phase relationship detected by said detection means.

2. Apparatus according to claim 1 wherein said detection means includes a sensing element for producing an output signal which varies in correspondence to the change in color temperature of the light source.

3. Apparatus according to claim 2 wherein said sensing element includes a light sensor which is responsive to the change in luminosity of the light source correlated to the color temperature.

4. Apparatus according to claim 1 wherein said control means includes:
   timing signal generation means for generating timing signals in accordance with the detected phase relationship; and
   means for applying each of said timing signals to control the timing of image pickup by said image pickup means.

5. Apparatus according to claim 1 wherein said control means includes means for adjusting a period of image pickup by said image pickup means.

6. An image pickup apparatus comprising:
   image pickup means for producing an image signal in response to a received image;
   detecting means for detecting a flicker component and its phase associated with a light source;
   first control means for controlling said image pickup means for producing the image signal in accordance with the detected phase of the flicker component; and
   second control means for controlling, when the flicker component is detected by said detecting means, a white balance of the output of said image pickup means based at least on predetermined white balance control information.

7. Apparatus according to claim 6 wherein said detection means includes a sensing element for producing an output signal which varies in correspondence to a change in color temperature of the light source.

8. Apparatus according to claim 7 wherein said sensing element includes a light sensor which is responsive to a change in luminosity of the light source correlated to the color temperature.

9. Apparatus according to claim 6 wherein said control means includes:
   timing signal generation means for generating timing signals having a predetermined cycle; and
   means for applying said timing signals to control the timing of image pickup by said image pickup means.

10. Apparatus according to claim 6 further comprising means for adjusting a period of image pickup by said image pickup means.

11. Apparatus according to claim 6 wherein said first control means controls a start timing of image pickup by said image pickup means.

12. An image pickup apparatus according to claim 6 wherein said predetermined white balance control information corresponds to a color temperature of a typical flicker light source.

13. Apparatus according to claim 6 wherein said second control means compensates the white balance in accordance with a level of the flicker component associated with the light source.

* * * * *

UNITED STATES PATENT AND TRADEMARK OFFICE
CERTIFICATE OF CORRECTION

PATENT NO. : 4,992,855

DATED : February 12, 1991

INVENTOR(S) : TAKEI

It is certified that error appears in the above-identified patent and that said Letters Patent is hereby corrected as shown below:

COLUMN 3

Line 18, "opened" should read --open--.

COLUMN 6

Line 35, "temperatures" should read --temperature--.

Line 40, "picking up" should read --pick up--.

Line 41, "temperatures" should read --temperature--.

COLUMN 13

Line 2, "temperatures" should read --temperature--.

Signed and Sealed this

First Day of December, 1992

Attest:

DOUGLAS B. COMER

*Attesting Officer*　　　*Acting Commissioner of Patents and Trademarks*